(12) United States Patent
Ciani et al.

(10) Patent No.: US 9,518,511 B2
(45) Date of Patent: Dec. 13, 2016

(54) METHOD FOR OPERATING A GAS TURBINE WITH SEQUENTIAL COMBUSTION AND GAS TURBINE FOR CONDUCTING SAID METHOD

(71) Applicant: ALSTOM Technology Ltd, Baden (CH)

(72) Inventors: Andrea Ciani, Zürich (CH); Adnan Eroglu, Untersiggenthal (CH); Douglas Anthony Pennell, Windisch (CH); Nicolas Tran, Zürich (CH); Ewald Freitag, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 474 days.

(21) Appl. No.: 14/060,065

(22) Filed: Oct. 22, 2013

(65) Prior Publication Data
US 2014/0109586 A1  Apr. 24, 2014

(30) Foreign Application Priority Data

Oct. 22, 2012  (EP) ..................................... 12189430

(51) Int. Cl.
*F02C 7/141* (2006.01)
*F02C 7/12* (2006.01)
(Continued)

(52) U.S. Cl.
CPC ................. *F02C 7/12* (2013.01); *F02C 7/141* (2013.01); *F02C 7/228* (2013.01); *F02C 9/28* (2013.01); *F05D 2270/08* (2013.01); *Y02E 20/16* (2013.01)

(58) Field of Classification Search
CPC ............... F02C 3/14; F02C 7/057; F02C 7/12; F02C 7/125; F02C 7/141; F02C 7/228; F02C 9/28; F23R 3/04; F23R 3/10; F23R 3/26; F23R 3/34; F23R 3/42
See application file for complete search history.

(56) References Cited

U.S. PATENT DOCUMENTS 5,836,164 A * 11/1998 Tsukahara ............... F23C 6/047
                                                                 60/733
6,058,710 A *  5/2000 Brehm ...................... F23R 3/34
                                                                 60/747

(Continued)

FOREIGN PATENT DOCUMENTS

CN        102330606 A    1/2012
DE        103 12 971     6/1958
(Continued)

*Primary Examiner* — Arun Goyal
(74) *Attorney, Agent, or Firm* — Buchanan Ingersoll & Rooney PC

(57) ABSTRACT

The invention discloses a method for operating a gas turbine with sequential combustion, which gas turbine includes a compressor, a first combustor with a first combustion chamber and first burners, which receives compressed air from the compressor, a second combustor with a second combustion chamber and second burners, which receives hot gas from the first combustor with a predetermined second combustor inlet temperature, and a turbine, which receives hot gas from the second combustor. The CO emission for part-load operation is reduced by reducing the second combustor inlet temperature for base-load operation of the gas turbine, and increasing the second combustor inlet temperature when decreasing the gas turbine load ($RL_{GT}$) from base-load to part-load.

16 Claims, 3 Drawing Sheets

(51) Int. Cl.
  *F02C 7/228*  (2006.01)
  *F02C 9/28*  (2006.01)

(56) References Cited

U.S. PATENT DOCUMENTS

| | | | | |
|---|---|---|---|---|
| 6,105,360 | A * | 8/2000 | Willis | F23R 3/40 |
| | | | | 60/723 |
| 6,389,798 | B1 * | 5/2002 | Tilston | F15C 1/08 |
| | | | | 60/39.23 |
| 7,137,256 | B1 * | 11/2006 | Stuttaford | F02C 7/228 |
| | | | | 60/746 |
| 7,191,588 | B2 * | 3/2007 | Tanaka | F02C 7/228 |
| | | | | 60/39.27 |
| 7,568,335 | B2 * | 8/2009 | Althaus | F02C 6/003 |
| | | | | 60/39.17 |
| 2002/0162333 | A1 | 11/2002 | Zelina | |
| 2011/0219779 | A1 * | 9/2011 | Critchley | F02C 3/14 |
| | | | | 60/773 |

FOREIGN PATENT DOCUMENTS

| | | |
|---|---|---|
| EP | 0 222 173 | 5/1987 |
| EP | 0974789 A1 | 1/2000 |
| EP | 1531305 A1 | 5/2005 |
| EP | 2 206 959 | 7/2010 |
| JP | H07-150977 | 6/1995 |
| JP | H07-166892 | 6/1995 |
| JP | 2012-087793 | 5/2012 |
| RU | 2229030 C2 | 5/2004 |
| WO | 03/038253 | 5/2003 |
| WO | 2007/028693 | 3/2007 |
| WO | 2007/141101 | 12/2007 |
| WO | 2010/112318 | 10/2010 |
| WO | 2012/136787 | 10/2012 |

* cited by examiner

METHOD FOR OPERATING A GAS TURBINE WITH SEQUENTIAL COMBUSTION AND GAS TURBINE FOR CONDUCTING SAID METHOD

CROSS-REFERENCE TO RELATED APPLICATIONS

This application claims priority to European application 12189430.7 filed Oct. 22, 2012, the contents of which are hereby incorporated in its entirety.

TECHNICAL FIELD

The present invention relates to the technology of gas turbines. It refers to a method for operating a gas turbine with sequential combustion according to the preamble of claim 1. It further relates to a gas turbine for the implementation of such a method.

BACKGROUND

Gas turbines with sequential combustion comprise two combustors as shown for example in FIG. 1. The gas turbine 10 of FIG. 1 has a rotor 11 which is concentrically surrounded by a casing 12. A compressor 13 compresses air which feeds into a first combustor comprising first combustion chamber 14 and first burners 17. The first burners 17 are supplied with a fuel by means of a first fuel supply 18. The hot gas generated in the first combustor 14, 17 flows through hot gas channel 21 into a second combustor comprising a second combustion chamber 15 and second burners 20. The second burners 20 are supplied with a fuel by means of a second fuel supply. The hot gas from the second combustor 15, 19 enters the turbine 16 to do work.

Usually, a high-pressure turbine is positioned between the first combustor 14, 17 and the second combustor 15, 19. However, in this case the high-pressure turbine has been omitted. Instead, dilution air may be injected into the hot gas channel 21 by means of a dilution air supply 23.

In part load operation of gas turbines, the combustor hot gas temperature typically decreases. At a certain hot gas temperature limit, CO emissions rise and set a limit to the emission guarantee range. The CO emissions typically rise when the gas turbine load is reduced from 100% to part-load is shown in FIG. 2, where the CO emission is shown as a function of the gas turbine relative load $RL_{GT}$, with the peak at 12 characterising the ignition of a second combustor. At a certain load limit $LT_L$ a predetermined CO limit $LT_{CO}$ is exceeded. At the same time the second combustor is characterised by a certain pressure drop which has a negative impact on performance.

To solve this problem, two different approaches have been proposed in the prior art:
 1. Starting the second combustor at the highest possible load. However, this is not very effective because the hot gas temperature for the first combustor needs to be maintained within limits imposed by the high pressure turbine lifetime (when a high pressure turbine is provided between first and second combustor).
 2. Switch off some of the second burners at low part-load, so that the remaining ones are fired at higher exit temperatures at a lower load. Such solution has the drawback of high stress to the low pressure turbine (16 in FIG. 1) and is limited by the temperature limits of the boiler (in a combined cycle power plant).

Further related prior art has been identified as follows:

Document DE 103 12 971 A1 discloses a gas turbine assembly, especially for a power unit, comprising a compressor and two downstream combustion chambers in series followed by a turbine. There is a cooling unit arranged between the two combustion chambers. This solution is based on sequential combustion without a high pressure turbine. Due to the missing high pressure turbine between the two combustors comparatively high gas temperatures result at the exit of the first combustor, which would result in a spontaneous ignition when fuel is injected at the second combustor, leading to excessive component thermal stresses near the fuel injection and an insufficient mixing of fuel and air resulting in high emission values.

To avoid this disadvantage it is proposed to cool down the hot combustion gas from the first combustion chamber before injecting fuel into the hot combustion gas to form the fuel-oxidant-mixture for the second combustion chamber. By cooling the hot combustion gas from the first combustion chamber or first combustion step the exhaust gas temperature can be reduced enough that the ignition of the injected fuel is delayed long enough to allow a detached flame and a sufficient mixture in order to have a homogenous and lean fuel-oxidant-mixture.

Document WO 03/038253 relates to the conversion of a sequentially-fired gas turbine unit, essentially comprising at least one compressor, a high pressure combustion chamber, a high pressure turbine, a low pressure combustion chamber and a low pressure turbine. The rotating parts of the compressor, high pressure turbine and low pressure turbine are arranged on a common rotor and on conversion all claimed considerations associated with said gas turbine unit can be advantageously simplified. The converted gas turbine unit comprises a reduced compressor, the original high pressure combustion chamber (operating at lower pressure), the original low pressure combustion chamber and the original low pressure turbine, whereby a reduction of the compressor is achieved by means of removing, without replacement, a number of the final high pressure stages, in relation to the direction of flow or by removing the same from drive and the original high pressure turbine is removed from function without replacement. The high pressure turbine is just a transfer channel between the high pressure combustion chamber and the low pressure combustion chamber. The hot gases flow from said high pressure combustion chamber through said transfer channel directly into the low pressure combustion chamber.

Document EP 2 206 959 A2 discloses a gas turbine system including a fuel reformer system comprising a fuel inlet configured to receive a fuel slipstream, an oxygen inlet configured to introduce an oxygen slipstream, a preconditioning zone configured to pre-treat the fuel slipstream, a mixing zone comprising a premixing device configured to facilitate mixing of the fuel slipstream and the oxygen slipstream to form a gaseous premix, a reaction zone configured to generate a syngas from the gaseous premix, a quench zone configured to mix a fuel stream into the syngas to form a hydrogen-enriched fuel mixture, and a gas turbine configured to receive the fuel mixture.

Document WO 2010/112318 A1 relates to a method for the low CO-emission partial load operation of a gas turbine having sequential combustion, wherein the air ratio of the operative burners of the second combustion chamber at partial load is kept below a maximum air ratio, and to a gas turbine for carrying out said method. In order to reduce the maximum air ratio, a number of modifications are performed in the operating concept of the gas turbine, individually or in combination. One modification is an opening of the adjustable compressor guide vane row before turning on the second combustion chamber. In order to turn on the second combustion chamber, the adjustable compressor guide vane row is quickly closed and fuel is conducted into the burners of the second combustion chamber in a synchronized way. A further modification is the turning off of individual burners at partial load.

SUMMARY

It is an objective of the present invention to provide a method for operating a gas turbine with sequential combustion which reduces CO emission and pressure drop for part-load operation without increasing the flashback risk.

A further objective of this invention is the provision of a gas turbine for implementing such a method.

This and other objectives are obtained by a method for operating a gas turbine with sequential combustion, where the gas turbine comprises a compressor, a first combustor with a first combustion chamber and first burners, which receives compressed air from the compressor, a second combustor with a second combustion chamber and second burners, which receives hot gas from the first combustor with a predetermined second combustor inlet temperature, and a turbine, which receives hot gas from the second combustor, in which the second combustor inlet temperature is reduced for base-load operation of the gas turbine, and that the second combustor inlet temperature is increased when decreasing the gas turbine load from base-load to part-load.

The second combustor inlet temperature can for example be reduced for base-load operation by admixing of a dilution air flow and/or by a reduction in the fuel to air ratio in the first combustor, thereby increasing the first combustion exit temperature.

The second combustor inlet temperature can be increased at part load relative to the base load inlet temperature for example by increasing the first combustor exit temperature. It can also be increased at part load relative to base load by reducing the dilution air flow relative to the dilution air flow at base load.

According to an embodiment of the invention dilution air is additionally mixed to the hot gas from the first combustor to achieve a reduced second combustor inlet temperature versus the exit temperature of the first combustor. Additional admixture of dilution air in this context can for example be an increase in the ratio of admixed dilution air to first combustor exit mass flow at part load relative to the ratio at base load.

Specifically, the dilution air mass flow is varied in order to achieve larger variations of second combustor inlet temperature. Larger variations mean larger than the variations, which would be achieved by only varying the first combustor outlet temperature. The variations of the first combustor outlet temperature are limited due to combustor stability and life time limitations. An increase to higher first combustor outlet temperatures is limited due to life time and pulsation limits. A decrease to lower first combustor outlet temperatures is limited by a flame out limit and extinguishing pulsations limits. This variation in dilution air flow may for example occur either as a driven proportion of the total combustor air as a result of variation in compressor exit massflow and first and second combustor firing temperatures and pressure distribution versus load, or by a regulated feed system.

According to another embodiment of the invention the exit temperature of the first combustor or second combustor inlet temperature, respectively, is controlled as a function of the gas turbine load.

According to a further embodiment of the invention the exit temperature of the first combustor or second combustor inlet temperature, respectively, is controlled as a function of the combustion pressure, especially in the first or second combustor or compressor plenum or at turbine inlet.

According to still another embodiment of the invention a gas with short ignition times, especially with high H2 content or a gas containing high proportion of higher order hydrocarbons, termed C2+ gas, is used as a fuel. A fuel gas for example containing more than 5% or more than 10% (mol %) H2 and/or C2+ can be considered as a gas with a high proportion of H2/C2+, and correspondingly have a short ignition time relative to the ignition time of a fuel gas with for example more than 95% or more than 90% methane content. A gas with short ignition time is a gas with an ignition time which is smaller than the ignition time of a fuel gas with 95% methane and a maximum of 5% H2 when using hydrogen containing fuels and a gas with short ignition time is a gas with an ignition time which is smaller than a fuel gas with 95% methane and 5% C2+ when using fuel gas containing higher order hydrocarbons. If the fuel gas contains H2 and C2+ the shorter ignition time is relevant to determine the "short ignition time" limit.

The gas turbine for conducting the method according to the invention comprises a compressor, a first combustor with a first combustion chamber and first burners, which receives compressed air from the compressor, a second combustor with a second combustion chamber and second burners, which receives hot gas from the first combustor with a predetermined second combustor inlet temperature, and a turbine, which receives hot gas from the second combustor. It is characterized in that a mixer is arranged in a hot gas channel directly connecting the first and second combustor, with said mixer connected to a dilution air supply.

According to an embodiment of the gas turbine of the invention the first burners are connected to a fuel supply, and that a control unit is connected to the dilution air supply and the fuel supply for controlling said supplies in order to control the exit temperature of the first combustor or second combustor inlet temperature, respectively.

According to another embodiment of the inventive gas turbine the control unit comprises an input for a load signal representing the gas turbine load.

According to a further embodiment of the invention the control unit comprises an input being connected to a pressure transducer, which senses a combustion pressure of the gas turbine.

According to a further embodiment of the invention the control unit comprises an input being connected to a temperature transducer, which senses the inlet temperature to the second burner/exit temperature of the first combustor.

BRIEF DESCRIPTION OF THE DRAWINGS

The present invention is now to be explained more closely by means of different embodiments and with reference to the attached drawings.

DETAILED DESCRIPTION

Figure 2:
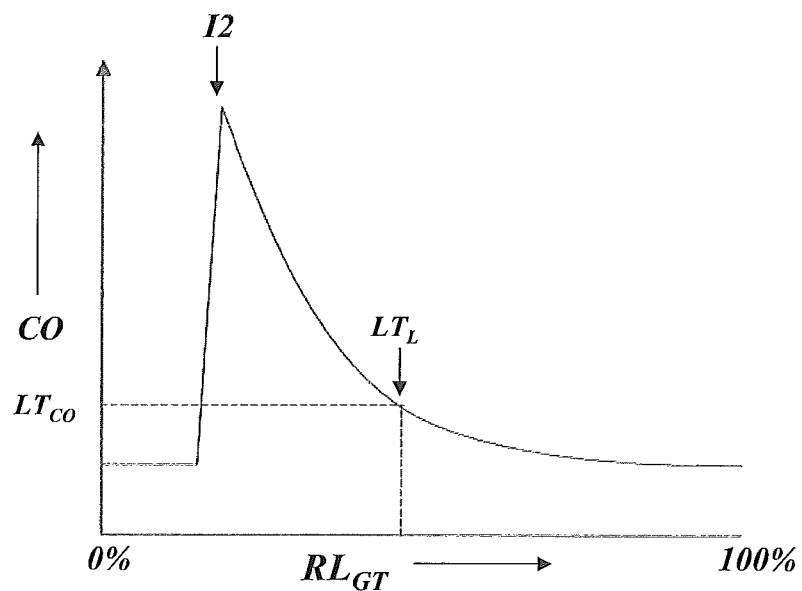
FIG. 2 shows the general dependence of the CO emission of a gas turbine with sequential combustion on the second combustor inlet temperature.
Figure 4:
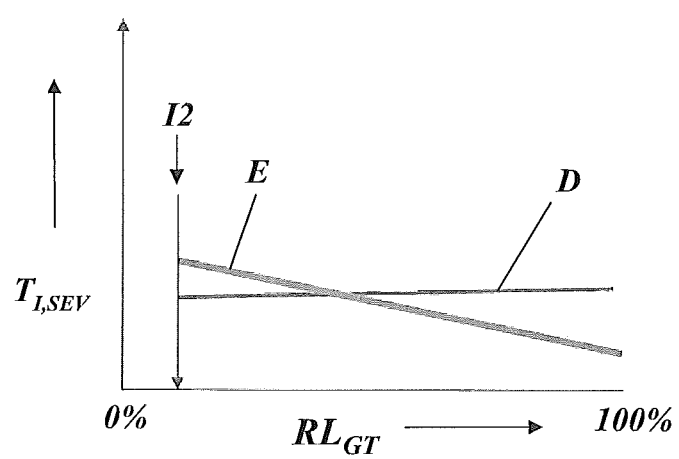
FIG. 4 shows a comparison of the variation of the second combustor inlet temperature with the gas turbine relative load in the prior art (curve D) and according to the invention (curve E)

In a state-of-the-art gas turbine operation concept (OPC), the inlet temperature to the second combustor ($T_{I,SEV}$) is maintained almost constant for the whole load range from base-load to part-load (see curve D in FIG. 4, which shows the inlet temperature to the second combustor, $T_{I,SEV}$, as a function of the relative load of the gas turbine, $RL_{GT}$). As shown in FIG. 2, the CO production increases dramatically at the low end of part-load.

Figure 3:
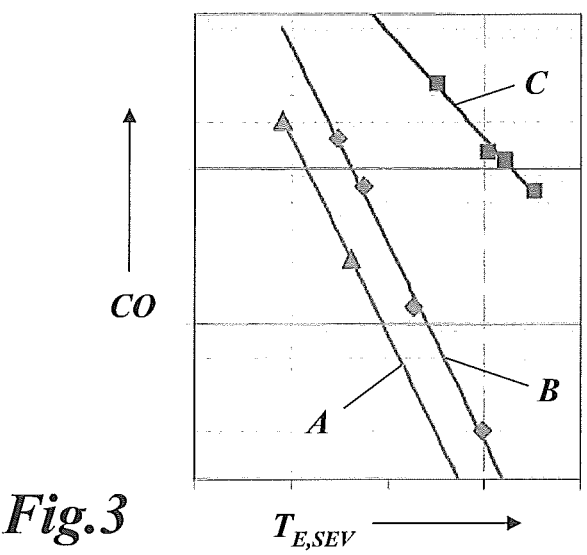
FIG. 3 shows the dependence of the CO emission of a gas turbine with sequential combustion on the second combustor exit temperature for different values of the second combustor inlet temperature.
Figure 5:
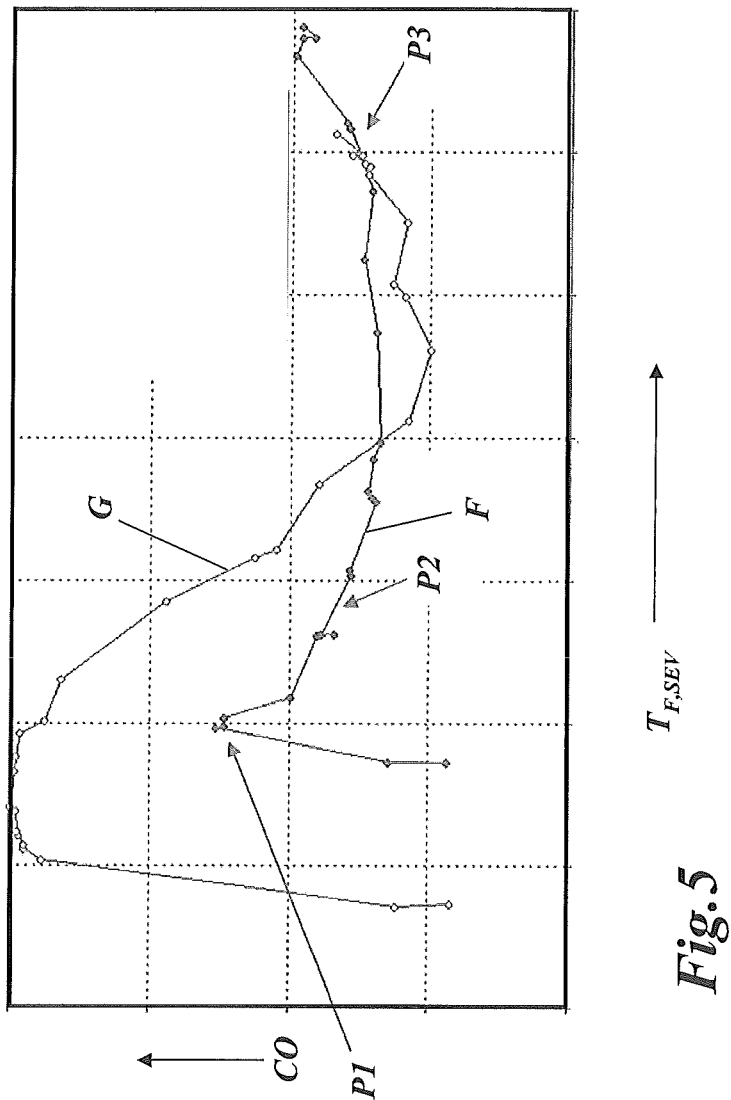
FIG. 5 shows experimental results for the CO emission of a gas turbine with sequential combustion in dependence of the second combustor flame temperature for low and high second combustor inlet temperature.

According to the present invention, an OPC is applied, which is characterised by a higher second combustor inlet temperature ($T_{I,SEV}$) at part-load (higher hot gas temperature from the first combustor) and lower second combustor inlet temperature at base-load (see curve E in FIG. 4). Because of the higher second combustor inlet temperature at part-load, such an OPC dramatically reduces the CO emissions at part-load as shown in the results shown in FIGS. 3 and 5. FIG. 3 shows CO emission as a function of the second combustor exit temperature $T_{E,SEV}$, whereby the parameter $T_{I,SEV}$ is varied (curve A is for $T_{I,SEV}=T_{I,SEV,A}$, curve B is for $T_{I,SEV}=T_{I,SEV,A}-50$ K and curve C is for $T_{I,SEV}=T_{I,SEV,A}-100$ K). FIG. 5 shows CO emission as a function of the second combustor flame temperature, $T_{F,SEV}$ whereby curve F relates to a high inlet temperature and curve G relates to a 100° K lower inlet temperature (curve F shows a reduced maximum ignition peak at point P1, an improved burnout at part-load conditions at point P2 and an equilibrium CO at base-load conditions similar to curve G at point P3).

Notably, no flashback issues are expected a part-load, in particular for carbon base fuels (i.e. natural gas, C2+, etc.) because of the longer ignition times due to the lower pressure.

At the same time, the burners of the second combustor can be designed for lower volume flow rates (and therefore velocities) which reduces significantly the pressure drop.

Notably, the minimum velocity (residence time) of a second (e.g. SEV) burner is given by the flashback limit at the highest pressure. By reducing the base-load inlet temperature ($T_{I,SEV}$ at 100%) the ignition time is extended so that the burner can run at lower velocity without any additional flashback risk. Also, a longer mixing section can be implemented for further NOx reduction.

In accordance with curve E of FIG. 4, the gas turbine is running with low $T_{I,SEV}$ at base-load (low hot gas temperature in the first combustor) and with high $T_{I,SEV}$ at part-load (high hot gas temperature in the first combustor). A high pressure turbine is not provided between first and second combustor.

According to a first embodiment of the invention, a mixer (22 in FIG. 1) is used to additionally mix dilution air supplied by a dilution air supply 23 to achieve the target second combustor inlet temperature ($T_{I,SEV}$).

Specifically, in the mixer 22, the dilution air mass flow is—in addition to a variation in the fuel supply—also varied in order to achieve larger variations of the second combustor inlet temperature ($T_{I,SEV}$).

An advantage of the method according to the invention is the possibility to increase the hot gas temperature of the first combustor ($=T_{I,SEV}$) much more. In the state of the art, where a high pressure turbine is provide between the two combustors, one is limited by said high pressure turbine: Either one loses too much life-time or needs too much cooling air for part load operation with an increased hot gas temperature of the first combustor.

An advantage of the method according to the invention is the possibility to operate the combustion system with varying gaseous fuel compositions without detriment to the engine performance, since more reactive gaseous fuels (which are less susceptible to part load CO production, but are characterised by shorter ignition delay times) can be derated in the first combustor at part and base load to reduce the overall inlet temperature to the second burner and second combustor. The second combustor firing temperature and inlet temperature to the turbine however remain unchanged. In a state-of-the-art gas turbine operation concept (OPC), the required reduction of the second burner burner inlet temperature for such reactive gaseous fuels would, by virtue of the presence of the high pressure turbine, result in an associated engine performance loss.

One can increase the hot gas temperature of the first combustor at part-load by >10% or even >20% of the absolute hot gas temperature of the first combustor at base-load (in the state of the art one is limited to some 50K). Therefore CO problems can be mitigated effectively.

At part-load the second combustor hot gas temperature, $T_{E,SEV}$, is reduced and typically the compressor inlet guide vanes are closed. The reduced mass flow with reduced turbine inlet temperature leads to a pressure, which is between 30% and 60% of the base-load pressure. This leads to a higher ignition delay time for the second burner. Therefore the flow velocity can be reduced without a flash back risk (=>low pressure drop) or gases with short ignition times can be burnt (high H2 content or high C2+ gases).

Figure 1:
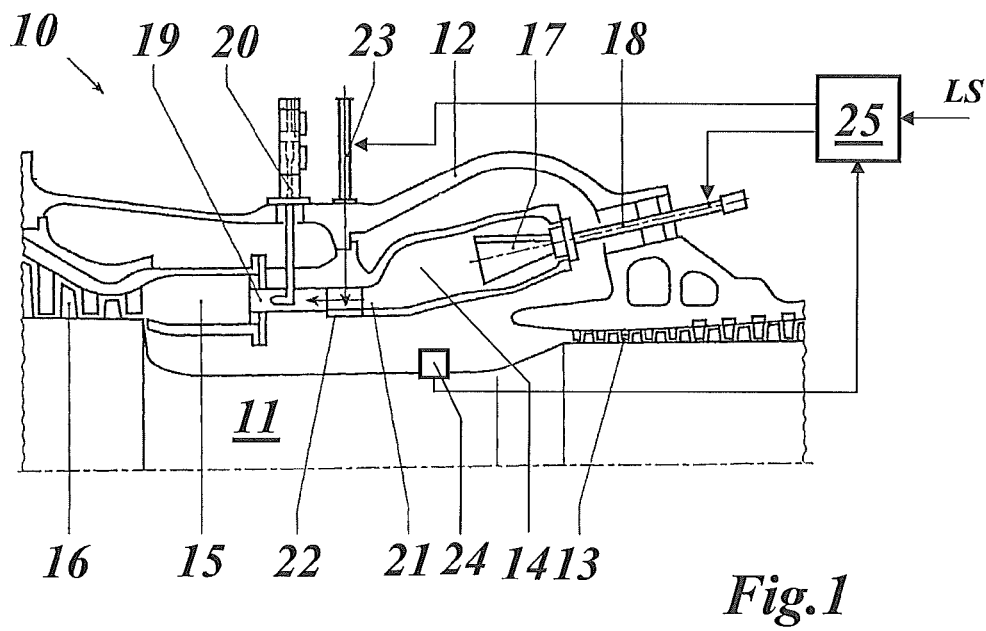
FIG. 1 shows a scheme of a gas turbine according to an embodiment of the invention.

The exit temperature of the first combustor ($=T_{I,SEV}$) can be controlled by a control of the fuel mass flow to the first combustor and/or by injection of a dilution air at the combustor exit (mixer 22 in FIG. 1).

According to a further embodiment of the invention the exit temperature of the first combustor 14, 17 is controlled as a function of the gas turbine load. In FIG. 1, a control unit 25 receives a load signal LS and controls the fuel supply 18 of the first combustor 14, 17 and/or the dilution air supply 23 of the mixer 22.

According to another embodiment of the invention the exit temperature of the first combustor 14, 17 is controlled as a function of the combustion pressure (e.g. in the first or second combustor/compressor plenum/turbine inlet pressure). In FIG. 1, for example, a pressure transducer 24 is provided to sense the pressure in the compressor plenum and is connected to the control unit 25.

The invention claimed is:

1. A method for operating a gas turbine with sequential combustion, in which the gas turbine includes a compressor, a first combustor with a first combustion chamber and first burners, which receive compressed air from the compressor, a second combustor with a second combustion chamber and second burners, which receive hot gas from the first combustor with a second combustor inlet temperature and a turbine, which receives the hot gas from the second combustor; no turbine being located between the first combustor and the second combustor and the hot gas being passed from an exit of the first combustor to an inlet of the second combustor via a hot gas channel extending between the first combustor and the second combustor, the method comprising:

controlling a flow of dilution air supplied to the hot gas channel;

mixing the dilution air with the hot gas from the exit of the first combustor in the hot gas channel via a mixer positioned in the hot gas channel;

reducing the second combustor inlet temperature for base-load operation of the gas turbine via the controlling of the flow of the dilution air supplied to the hot gas channel via the mixer, and increasing the second combustor inlet temperature when decreasing gas turbine load from the base-load to part-load via the controlling of the flow of the dilution air supplied to the hot gas channel via the mixer.

2. The method according to claim 1, comprising varying the dilution air mass flow to increase the second combustor inlet temperature in response to decreasing the gas turbine load from the base-load to the part-load.

3. The method according to claim 1, comprising controlling an exit temperature of the first combustor or the second combustor inlet temperature as a function of the gas turbine load.

4. The method according to claim 1, comprising controlling an exit temperature of the first combustor or second combustor inlet temperature as a function of combustion pressure in the first combustor or the second combustor or compressor plenum or at an inlet of the turbine.

5. The method according to claim 1, wherein a gas with high H2 content or with a high C2+ concentration is used as a fuel.

6. A gas turbine comprising:
a compressor,
a first combustor with a first combustion chamber and first burners, which receives compressed air from the compressor,
a second combustor with a second combustion chamber and second burners, which receives hot gas from the first combustor with an inlet temperature of the second combustor, and
a turbine, which receives the hot gas from the second combustor;
a mixer arranged in a hot gas channel directly connecting the first combustor and the second combustor, the hot gas channel extending between the first combustor and the second combustor to supply the hot gas from an exit of the first combustor to an inlet of the second combustor; the mixer being connected to a dilution air supply, the mixer configured to mix air from the dilution air supply with the hot gas in the hot gas channel; and
a controller configured to control the dilution air supplied to the hot gas channel;
wherein there is no turbine located between the first combustor and the second combustor;
wherein the inlet temperature of the second combustor is reduced for base-load operation of the gas turbine and the inlet temperature of the second combustor is increased when decreasing gas turbine load from the base-load to part-load via control of the dilution air supply.

7. The gas turbine according to claim 6, wherein the first burners are connected to a fuel supply, and the controller is connected to the dilution air supply and the fuel supply for controlling said fuel supply and said dilution air supply in order to control an exit temperature of the first combustor or the inlet temperature of the second combustor.

8. The gas turbine according to claim 7, wherein the controller comprises an input for a load signal representing the gas turbine load.

9. The gas turbine according to claim 7, wherein the controller comprises an input device connected to a pressure transducer, which senses a combustion pressure of the gas turbine.

10. A method of operating a gas turbine with sequential combustion comprising:

compressing air in via a compressor;

receiving compressed air from the compressor by a first combustor having a first combustion chamber and first burners;

mixing dilution air with hot gas received from an exit of the first combustor in a hot gas channel extending between the exit of the first combustor and an inlet of a second combustor via a mixer to reduce a temperature of the hot gas and to reduce an inlet temperature of the second combustor during base-load operation of the gas turbine;

receiving the hot gas from the exit of the first combustor at the inlet of the second combustor via the hot gas channel, the second combustor having a second combustion chamber and second burners and wherein there is no turbine located between the first combustor and the second combustor;

controlling a flow of the dilution air supplied to the hot gas in the hot gas channel via a controller to control reduction of the inlet temperature of the second combustor during the base-load operation of the gas turbine;

adjusting a second combustor inlet temperature target based on a load of the gas turbine such that the inlet temperature of the second combustor is reduced when the gas turbine is at the base-load operation and the inlet temperature of the second combustor is increased when gas turbine load decreases from the base-load to a part-load via the controlling the flow of the dilution air.

11. The method of claim 10, comprising:
varying an amount of the dilution air mass flow mixed with the hot gas from the first combustor to increase the inlet temperature of the second combustor in response to the gas turbine load decreasing from the base-load to the part-load.

12. The method of claim 10, comprising:
feeding the hot gas from the second combustor to a turbine.

13. The method of claim 10, comprising:
controlling an exit temperature of the first combustor or the inlet temperature of the second combustor as a function of the gas turbine load.

14. The method of claim 10, comprising:
controlling an exit temperature of the first combustor or the inlet temperature of the second combustor as a function of a pressure in one of: the first combustor, the second combustor, and a turbine that receives the hot gas from the second combustor.

15. The method of claim 14, comprising:
varying an amount of the dilution air mass flow mixed with the hot gas from the first combustor to increase the inlet temperature of the second combustor in response to the gas turbine load decreasing from the base-load to the part-load.

16. The method of claim 14, wherein the second combustor inlet temperature target is a target temperature for controlling the inlet temperature of the second combustor.

* * * * *